United States Patent [19]
Cumming et al.

[11] Patent Number: 6,001,944
[45] Date of Patent: Dec. 14, 1999

[54] CURABLE COMPOSITION

[75] Inventors: Sarah Cumming, Dinas Powys, United Kingdom; Patrick Merlin, Neufvilles, Belgium

[73] Assignee: Dow Corning Limited, South Wales, United Kingdom

[21] Appl. No.: 09/193,340

[22] Filed: Nov. 16, 1998

[30] Foreign Application Priority Data

Nov. 15, 1997 [GB] United Kingdom .................. 9724125

[51] Int. Cl.$^6$ .................................................. C08G 77/08
[52] U.S. Cl. ............................................. 528/24; 524/588
[58] Field of Search ................................ 528/24; 524/588

[56] References Cited

U.S. PATENT DOCUMENTS

| | | | |
|---|---|---|---|
| 4,728,687 | 3/1988 | Watanabe et al. | 524/493 |
| 4,743,671 | 5/1988 | Dorn et al. | 528/24 |

FOREIGN PATENT DOCUMENTS

| | | | |
|---|---|---|---|
| 282 130 | 9/1988 | European Pat. Off. | C08K 5/14 |
| 59-232145 | 6/1983 | Japan | C08L 83/04 |

OTHER PUBLICATIONS

Bolton et al., J. Fluorine Chem. (1975), vol. 5, No. 1, pp. 61–65.

Sever—Mater. Vses. Nauchn. Stud. Konf.. "Stud. nauchno–Tekh. Prog."Khim. (1983) pp. 3–9.

Roth et al. —J. Amer. Chem. Soc. (1973), vol. 95, No. 1, pp. 262–264.

Bevington et al, —Eur. Polym. (1997), vol. 33, No. 8, pp. 1225–1229.

Swain et al. —J. Amer. Chem. Soc. (1950), vol. 72, pp. 5426–5434.

Blomquist et al. —J. Amer. Chem. Soc. (1951), vol. 73, pp. 3883–3888.

Price and Krebs —Org. Syntheses (1943), vol. 23, p. 65.

Jehlicka et al. —Inst. Org. Chem. Biochem., Czech Acad. Sci. (1975), vol. 40, No. 10, pp. 3004–3008.

Kavcic et al. —J. Chromatogr. (1972), vol. 66, No. 2, pp. 321–328.

Kobrina et al. —Izv. Sib Otd. Akad. Nauk SSSR, Ser. Khim. Nauk. (1986), No. 2, pp. 91–99.

*Primary Examiner*—Margaret G. Moore
*Attorney, Agent, or Firm*—Jennifer S. Warren; William F. Boley

[57] ABSTRACT

A curable composition comprises a siloxane polymer, filler and a curing agent which is capable of effecting the cure when heated, wherein the curing agent comprises bis(2,4-difluorobenzoyl) peroxide or bis(2,6-difluorobenzoyl) peroxide. The composition is curable to a elastomeric condition by heat.

17 Claims, No Drawings

CURABLE COMPOSITION

The present invention is a curable composition, in particular a silicone composition curable to an elastomeric condition by heat.

Silicone compositions curable to an elastomeric condition typically comprise a siloxane polymer, a filler and a curing agent which is capable of effecting the cure when heated.

Compositions of this type may employ a peroxide curing agent, for example dicumyl peroxide, 2,5-di(tertiary butylperoxy)hexane or bis(2,4-dichlorobenzyl)peroxide. Of these peroxide curing agents bis(2,4-dichlorobenzyl) peroxide gives the most effective cure under hot air vulcanization (HAV) conditions, but has the problem of evolution of toxic polychlorinated biphenyl compounds (PCBs) under these conditions. Therefore there is a need for an alternative curing agent to bis(2,4-dichlorobenzyl)peroxide for HAV cure of silicone compositions.

EP-A-282130 discloses the use of bis(2-fluorobenzoyl) peroxide as a curing agent for crosslinking silicone rubbers.

The present invention is a curable composition which comprises a siloxane polymer, filler and a curing agent which is capable of effecting the cure when the composition is heated, wherein the curing agent comprises bis(2,4-difluorobenzoyl) peroxide or bis(2,6-difluorobenzoyl) peroxide. Preferably, the curing agent is substantially bis(2,6-difluorobenzoyl)peroxide.

Siloxane polymers suitable for use in the present invention include those comprising units of the general formula $R_nSiO_{(4-n)/2}$ aryl and alkenyl groups, and n is 1, 2 or 3. The siloxane polymer used in the composition of the present invention is preferably a polydiorganosiloxane having silicon-bonded organic substitutents selected from methyl groups, fluoroalkyl groups, phenyl groups and vinyl groups, and in which at least 70 percent of the total substitutents are methyl groups and from 0.01 to 2 percent, for example 0.04 to 1 percent, are vinyl groups. Any remaining substitutents may be phenyl groups. Polydiorganosiloxanes usable in the present invention include copolymers of dimethylsiloxane and methylvinylsiloxane units, copolymers of dimethylsiloxane, methylvinylsiloxane and methylphenylvinylsiloxane units, copolymers of dimethylsiloxane, methylvinylsiloxane and trimethylsiloxane units and copolymers of dimethylsiloxane, methylvinylsiloxane and diphenysiloxane units.

The composition of the present invention contains any one or more fillers, including those fillers conventionally employed in the manufacture of siloxane elastomers. Suitable fillers include reinforcing silicas, magnesium oxide, clay, diatomaceous earth, calcium carbonate and finely ground quartz, with silica fillers, for example precipitated or fumed silica, being preferred.

The amount of filler employed in the present composition is not narrowly critical but is preferably in the range of from 5 to 200 parts by weight per 100 parts by weight of the siloxane polymer.

The filler may be treated to improve its compatibility with the other components of the present composition or its storage stability. The filler may be pre-treated or treated in situ by the addition of one or more treating agents, also referred to as plasticizers, during mixing of the compositions. Suitable filler treating agents include silanes, such as dimethyldichlorosilane and trimethylethoxysilane, siloxanes such as cyclic siloxanes and hydroxyl or vinyl or phenyl substituted low molecular weight polydimethylsiloxanes and silazanes such as hexamethyl-disilazane.

To facilitate safer mixing of the peroxide curing agent employed in the present composition with the remaining components thereof, the peroxide curing agent may be employed as a paste in a suitably inert carrier, preferably a polydimethylsiloxane, which is compatible with the other components in the composition. The curing agent is incorporated in an amount which is conventional for peroxide cure of siloxane elastomers, for example from 0.5 to 6 parts by weight (preferably 0.5 to 2.0 parts by weight) per 100 parts of the total weight of polydiorganosiloxane plus filler.

The present curable composition may be prepared using conventional siloxane elastomer mixing or compounding equipment. For use as a molding material, the present curable composition should have a viscosity which renders it capable of being dispensed and processed with the appropriate equipment. It is preferred that the composition comprises one or more polydiorganosiloxanes of molecular weight in excess of 500,000 containing about 0.1 to 0.5 mole % units of the formula $(CH_3)_2(CH_2=CH_2)SiO_{1/2}$ or $(CH_2)(CH_2=CH_2)SiO$, a low molecular weight polydiorganosiloxane as plasticizer and silica filler. In general, it is preferred that the silica filler is employed in a proportion of from 30 to 160 parts by weight per 100 parts by weight of polydiorganosiloxane.

Compositions according to the invention may be used to provide elastomeric moldings. They may be used, for example, to provide a molding which comprises introducing to a mold having a closed molding cavity a composition according to the invention, heating the mold to a temperature in the range 100° C. to 150° C. and stripping the cured composition from the mold.

Heating of the mold may be achieved according to known procedures and is most conveniently carried out by electrical heating. If desired the initial cure step may be followed by a post-cure at a higher temperature.

The present invention will now be illustrated by way of example.

EXAMPLE

Example curable compositions according to the present invention were prepared as follows.

i) Peroxide Curing Agent Preparation

Peroxide curing agents bis(2,4-difluorobenzoyl)peroxide and bis(2,6-difluorobenzoyl)peroxide were prepared using the method of C. C. Price and E. Krebs in Org. Synthesis, 23, 65 (1943)—approximately 5 g of the appropriate acid chloride was dissolved in 15 g of toluene, which solution was added dropwise to a 10% aqueous solution of sodium peroxide (1.48 g of $Na_2O_2$ in 13.3 g of distilled water) with vigorous stirring. Stirring of this solution continued for one hour after addition of the acid chloride mixture. Throughout the synthesis the solution temperature was kept between −5° C. and 5° C.

Following synthesis, the solution was stored overnight in a freezer, during which time the desired peroxide product precipitated out as a white crystalline solid and was filtered off and washed with hexane. The peroxide was then dried under vacuum a nd stored in a freezer until use.

ii) Curable Composition Preparation

Curable compositions according to the invention were prepared using powdered peroxide curing agents prepared as described in i) above. Two sets of compositions were prepared—a first set in which each composition contained 0.001579 mols of peroxide curing agent, and a second in which each contained 0.002849 mols of peroxide curing agent (designated set A and set B respectively). The remainder of each composition comprised siloxane polymer gum of approximately 100,000 cst (a 50:50 blend of dimethylvinylsiloxy terminated dimethylmethylvinylsiloxane and dimethylvinylsiloxy terminated dimethylsiloxane) and amorphous silica filler in a siloxane polymer gum to filler ratio of 70:30, and each was prepared by blending the above components together in a two-roll mill with water cooling.

In addition, set A included a comparative composition using bis(2,4-dichlorobenzyl)peroxide as curing agent, which was also prepared according to the method of i) above.

For each composition the 1.2 parts of peroxide were used per 100 parts of siloxane polymer and filler together.

iii) Cure Testing

Each of the Example compositions of the present invention together with the comparative composition, prepared as described in ii) above, were cured at temperatures of 100° C., 116° C. and 140° C. recording the cure data on a MDR2000E Rheometer, according to ASTM-D 2084. The torque required to oscillate a disk embedded in a test specimen through a small arc was measured. The torque, which increases as the elastomer vulcanizes is automatically plotted as force in Newton meter (Nm) vs. time. T10 and T90 cure characteristics (for an explanation of which see, for example, Morton "Rubber Technology" 3rd Edition, pp 106–115) and final torque figures for each cured composition are given in the Tables below, in which:

a) T10 and T90 figures are in minutes
b) Final figures are in Nm
c) Comp.=bis(2,4-dichlorobenzyl)peroxide
d) 2,4=bis(2,4-difluorobenzoyl)peroxide
e) 2,6=bis(2,6-difluorobenzoyl)peroxide

| Cure Data @ 100 C | | | | |
|---|---|---|---|---|
| Peroxide | Set | T10 | T90 | Final |
| Comp. | A | 1.05 | 3.48 | 0.98 |
| 2,4- | A | 2.88 | 5.54 | 0.67 |
| 2,4- | B | 2.00 | 4.99 | 0.91 |
| 2,6- | A | 1.63 | 4.63 | 0.90 |
| 2,6- | B | 1.24 | 4.03 | 1.05 |

| Cure Data @ 116 C | | | | |
|---|---|---|---|---|
| Peroxide | Set | T10 | T90 | Final |
| Comp. | A | 0.38 | 1.16 | 0.99 |
| 2,4- | A | 0.75 | 2.61 | 1.06 |
| 2,4- | B | 0.54 | 1.73 | 1.15 |
| 2,6- | A | 0.48 | 1.64 | 1.09 |
| 2,6- | B | 0.39 | 1.30 | 1.24 |

| Cure Data @ 140 C | | | | |
|---|---|---|---|---|
| Peroxide | Set | T10 | T90 | Final |
| Comp. | A | 0.18 | 0.37 | 1.00 |
| 2,4- | A | 0.30 | 0.67 | 0.94 |
| 2,4- | B | 0.22 | 0.51 | 1.23 |
| 2,6- | A | 0.21 | 0.45 | 0.96 |
| 2,6- | B | 0.22 | 0.44 | 1.05 |

That which is claimed is:

1. A curable composition which comprises a siloxane polymer, filler and a curing agent which is capable of effecting curing of the composition when heated, wherein the curing agent comprises bis(2,4-difluorobenzoyl) peroxide or bis(2,6-difluorobenzoyl) peroxide.

2. The curable composition of claim 1 where the curing agent consists essentially of bis(2,6-difluorobenzoyl) peroxide.

3. The curable composition of claim 1 where the curing agent is incorporated at about 0.5 to 6 parts by weight per 100 parts of the total weight of siloxane polymer plus filler.

4. The curable composition of claim 1 where the curing agent is incorporated at about 0.5 to 2.0 parts by weight per 100 parts of the total weight of siloxane polymer plus filler.

5. The curable composition of claim 1 where the siloxane polymer is a polydiorganosiloxane having silicon-bonded organic substitutents selected from methyl groups, fluoroalkyl groups, phenyl groups and vinyl groups, and in which at least 70 percent of the total substitutents are methyl groups and from 0.01 to 2 percent are vinyl groups.

6. The curable composition of claim 1 where the filler comprises 5 to 200 parts by weight silica for each 100 parts by weight of the siloxane polymer.

7. The curable composition of claim 1 where the filler comprises about 30 to 160 parts by weight silica for each 100 parts by weight of polydiorganosiloxane.

8. The composition of claim 1 where the composition comprises one or more polydiorganosiloxanes of molecular weight in excess of 500,000 containing about 0.1 to 0.5 mole % units of the formula $(CH_3)_2(CH_2=CH_2)SiO_{1/2}$ or $(CH_2)(CH_2=CH_2)SiO$, a low molecular weight polydiorganosiloxane as plasticizer, and silica filler.

9. The curable composition of claim 5 wherein from 0.04 to 1 percent of the total substitutents are vinyl groups.

10. A curable composition which comprises a siloxane polymer, filler and a curing agent which is capable of effecting curing of the composition when heated, wherein the curing agent consists essentially of bis(2,4-difluorobenzoyl) peroxide.

11. The curable composition of claim 10 where the curing agent is incorporated at about 0.5 to 6 parts by weight per 100 parts of the total weight of siloxane polymer plus filler.

12. The curable composition of claim 10 where the curing agent is incorporated at about 0.5 to 2.0 parts by weight per 100 parts of the total weight of siloxane polymer plus filler.

13. The curable composition of claim 10 where the siloxane polymer is a polydiorganosiloxane having silicon-bonded organic substitutents selected from methyl groups, fluoroalkyl groups, phenyl groups and vinyl groups, and in which at least 70 percent of the total substitutents are methyl groups and from 0.01 to 2 percent are vinyl groups.

14. The curable composition of claim 10 where the filler comprises 5 to 200 parts by weight silica for each 100 parts by weight of the siloxane polymer.

15. The curable composition of claim 10 where the filler comprises about 30 to 160 parts by weight silica for each 100 parts by weight of polydiorganosiloxane.

16. The composition of claim 10 where the composition comprises one or more polydiorganosiloxanes of molecular weight in excess of 500,000 containing about 0.1 to 0.5 mole % units of the formula $(CH_3)_2(CH_2=CH_2)SiO_{1/2}$ or $(CH_2)(CH_2=CH_2)SiO$, a low molecular weight polydiorganosiloxane as plasticizer, and silica filler.

17. The curable composition of claim 13 wherein from 0.04 to 1 percent of the total substitutents are vinyl groups.

* * * * *